United States Patent [19]

Hörmansdörfer

[11] Patent Number: 5,694,819
[45] Date of Patent: Dec. 9, 1997

[54] METHOD AND DEVICE FOR FORM CUTTING AND FORM TURNING

[76] Inventor: Gerd Hörmansdörfer, Kastanieneck 6A, Burgdorf-Beinhorn, Germany, 31303

[21] Appl. No.: 563,914

[22] Filed: Nov. 29, 1995

[30] Foreign Application Priority Data

Nov. 29, 1994 [DE] Germany ............... 44 42 389.6

[51] Int. Cl.$^6$ ....................................... B23B 5/36
[52] U.S. Cl. ................................. 82/19; 82/1.4
[58] Field of Search ............... 82/1.2, 1.3, 1.4, 82/1.5, 18, 19

[56] References Cited

U.S. PATENT DOCUMENTS

| | | | |
|---|---|---|---|
| 485,233 | 11/1892 | Smith | 82/1.3 |
| 1,270,144 | 6/1918 | Gallimore | 82/1.3 |
| 1,356,571 | 10/1920 | Ungerman | 82/1.3 |
| 1,540,826 | 6/1925 | Watts | 82/1.3 |
| 1,956,740 | 5/1934 | Gress | 82/1.3 |
| 3,813,969 | 6/1974 | Wheeler | 82/1.3 |
| 5,542,324 | 8/1996 | Hormansdorfer | 82/1.3 |

Primary Examiner—Steven C. Bishop
Attorney, Agent, or Firm—Stein, Pendorf & Van Der Wall

[57] ABSTRACT

The invention concerns a special process and a device for the form cutting and form turning of work pieces. It is proposed, for a processing of this type for the purpose of production of unround geometries of this type as well as also work pieces as also the machining tool to rotate with a precisely defined opposingly radially spacing, preferably in the like direction of rotation, and thereby the number of rotations of the two rotating components with a determined like rotation number relationship so to correspond with respect to each other, that a simple cutter of the machining tool during its orbit about 360° comes into contact with the work piece to be machined only in a partial sector of an "active" sector. Thereby it is so controlled according to the invention within this machining sector and forcibly guided by means of a curve disk in a radial plane, that out of the relative movement to the rotating work piece the geometry to be machined is produced. With the device according to the invention complicated face side penetrations or, as the case may be, peripheral penetrations from behind, can be produced with a large number of unround shapes in a short processing time with a very high trueness to the original form.

7 Claims, 5 Drawing Sheets

METHOD AND DEVICE FOR FORM CUTTING AND FORM TURNING

BACKGROUND OF THE INVENTION

1. Field of the Invention

The invention concerns a special process for form cutting and form turning as well as a device for the carrying out of the process. The two work processing methods are used in the cutting or machining of work pieces, conventionally those made of metal. Herein there is understood under the concept of form turning in the sense of the invention that an unround contour is brought into the front face, and mainly contours having a more or less radial course (for example slits, stars, etc.), in the work piece, or as the case may be, using form turning in the shaping of an unround design (for example a four sided, six sided, key hole surface, and the like) at the perimeter of the work piece.

2. Description of the Related Art

In the industry such shapes of the most diverse constructional features are required for the most varied utilities. For the mass production of parts with these types of geometries, frequently recourse is made to cold- or Warm- power press extrusion, and in part also to casting or scintering, since with these processes it is possible to produce pieces with usable outer surfaces and with low unit costs. When the respective construction element cannot be produced by this type of process or when smaller production numbers are required, then only a turning process, above all milling, comes into consideration for the production thereof. A disadvantage of the milling technique is, however, the relatively slow work progress, such that milled parts often bear a relatively high cost.

Presently certain apparatus are known, with which unround geometries can be turned with short processing times; however, these devices are subject to various disadvantages. So, for example, a device is already known, which can be clamped upon the machine table of a milling machine, and which makes it possible to receive a work piece in a rotatable chuck or collet. The chuck is coupled to the spindle of the milling machine, in order to be brought into a rotational movement during the processing. At the same time, a cutter head situated in this spindle is turning about. Out of the relative movement of the two rotating components, there results a multi-sided geometry wherein the number of the surface elements depends upon the numeric rotation relationship between the work piece and work tool and the number of tool cutters. The disadvantage of this device is that it requires a large amount of time for installation, that the work piece must generally be repositioned and reclamped during processing, so that it is not possible to accomplish a so-called complete processing from the beginning on, and further, insofar as the finished surfaces are characterized by a certain rounding of the edges, have only an approximate correspondence to the desired form, and besides this the geometrical possibilities are limited when it comes to multiple edges.

On the other hand a device is known from DE-OS 4039489 A1, which uses the turning technique for the production of the most diverse geometries of boreholes and perimetries of the work pieces with high dimensional accuracy and with the smallest amount of time expenditure. With this device it is however only possible to produce at best rotary recesses on the front surface thereof. Certain more-or-less radially running passes or perforations can not be realized therewith. It is herewith also not possible to dive in below the upper surface of the work piece at it's periphery, in order there to produce at its circumference, by cutting or turning, two keyhole surfaces recessed behind the upper surface. Disadvantageous with this indicated device is also, that very good tolerance of the measurements of this type of contour, for example by means of a correctional input in the numeric control of the work tool machine, is generally not possible because of the selected processes. A fine adjustment of the cutting edge or, as the case may be, a readjustment because of cutting edge wear, is only possible by hand by adjustment of an eccentric or offset adjustment taper ring.

There arises thus a need for the development of a process and a device in this technology, with which it becomes possible to produce non-round shapes with high precision and at the same time with high metal cutting capacity on the outer face or, as the case may be, also by diving behind about the periphery of the work piece.

SUMMARY OF THE INVENTION

The above mentioned task is solved according to the invention by the creation of a special process and a device for carrying out the process. In accordance therewith it is proposed, that both the work piece to be machined as well as the tool carrier, which is provided with at least one cutter, be brought into a preferably cooperative or coordinated rotational relationship and thereby establish a precisely predetermined rotational relationship with respect to each other. Work piece and work tool are then rotated about rotating axis having a pre-determined radial separation from each other, in order to thereby produce a shearing. In accordance with the invention the cutting edge is then deflected during its cycle so as to depart from a purely circular orbital path in the radial plane so that the contour to be cut is produced by the relative movement of the revolving cutting tip to the rotating work piece. The cutting tip, during its cycle about 360°, is in contact with the work piece essentially only in a segment in order to produce cutting work. This metal removal sector is designated by the rotation angle (or arc) $\alpha$. The metal removal sector is preceded by an approach sector with an arc $\beta$, and as the case may be, a departure sector with an arc $\gamma$. The sum of the arcs comprised of the approach sector, the metal removal sector and the departure sector is indicated as the active sector with the arc $\theta$, while the difference between the total circumference angle of 360° and the active sector defines the passive sector $\kappa$. In principle the passive sector serves for the return movement of the cutter in the direction of the re-entry in the work piece, while the so called curve fill pieces as described by the approach and departure movements of the moving cutting tool cutters in the respective sectors have the task, of realizing an as stable as possible movement along the curve with tangential transition between the curve sectors. Further, it is made possible to provide the work tool carrier with a number n of cutters. The revolution angle or arc $\alpha$ of the metal removal or cutting sector can then be calculated as $360°: n-(\beta:2)-(\gamma:2)$. It is recommended as being particularly advantageous, to set up the approach sector or, as the case may be, the departure sector, to be as small as possible, that is, to use a plurality of cutters according to the contour elements of the geometry to be machined, in order that a high metal removal or machining capacity is realized. In the most economical case the appropriate correspondence will result, when a second cutter comes in contact with the work piece precisely in the moment, when a first cutter is taken away from the work piece. For the number x of self repeating contour elements or, as the case may be, the number n of the cutters, the values to be considered are intrinsically values between 1 and 12. The preferable rotation number relationship to be achieved between the work piece and the tool can be indicated as the inversely proportional relationship x:n.

The device which is provided according to the invention for carrying out the process is comprised essentially of a fixed housing, a rotating drive shaft, a revolving work tool carrier with at least one cutter, as well as elements for positive movement control of the work tool carrier. The device according to the invention is primarily envisioned for the use upon a lathe with a driven work tool. The piece to be machined is tensioned in the chuck of the lathe, while the device is mounted on the revolver of the cross sled in a driven position.

The drive shaft for the device serves for inputting of the necessary torque for cutting and is rotatably mounted in the housing by means of roller bearings. It can be so constructed that the device can be accepted by all conventional or specialized systems, so that the device is universally couplable to the appropriate machine-side cutting station and the drive.

The housing, which is immobile during operation, is preferably so designed, that it can be secured upon the revolver disk of a lathe with driven work tools, whereby simultaneously the connection for the coolant lubricating means can be engaged. To the housing there is also associated a control device, which is provided at least a cam disk which is securely coupled to the housing and is preferably provided so as to be capable of being changed out. The control unit is preferably provided with a dial and can be adjusted by turning, so that the angle of rotation of the curve path or movement relative to the position of the housing can be read or, as the case may be, precisely adjusted.

In the housing a work tool carrier is so provided rollingly that it can be controlled, with exclusion of any tilting movement, during it's own rotation to be capable of being diverted in the radial direction. It is connected with the drive shaft with a special coupling (for example Oldham-coupling, Schmidt-coupling, cardan-coupling, Helicoflex-coupling, screw, spring, or the like), so that a rotational force component from the drive shaft is transmitted to the work tool carrier, even when the work tool carrier is diverted in a radial displaced position. The work tool carrier is provided with elements, each of which roll preferably upon a single cam disk by means of rolling elements (for example ball bearings, needle bearings, roller socket, roller bodies) and a preferably three thereof are provided. The work tool carrier is optionally provided on its lower end with a direct receptacle for at least one exchangeable cutting plate or template, or a receptacle for a work tool shaft. It is preferable, when the work tool carrier is provided with a flow conduit for a fluid cooling lubricating material, in order to facilitate the removal and transport away of cuttings and turnings an to improve the cooling of the work tool cutter.

In retrospect upon the intended function to be achieved by the device, the curve shape of the cam disk becomes of particular importance. This curve shape is so designed, that the three roller bodies associated with the work tool carrier are in constant contact, without play, and can revolve about in constant contact without play and in accordance therewith can each, one after the other, follow identical tracks. With the invention it is proposed that the curve movement is dissected into a number of regions. A rough breakdown involves first a so-called active and a so-called passive sector, wherein the passive sector is in principal essentially the return movement of the circumscribing work tool cutter back to a defined starting point. Since the work tool cutter has no contact with the work piece in this area, the precise shape of this curve segment is without consequence, particularly compared to the track to be described for the work tool cutter in the removal sector. Accordingly, this curve segment can be used as a complementary curve to the remaining curve region. Only this arrangement makes possible the utilization of essentially only a single curve disk and the realization of the repetition of contour sequences.

The so-called active region of the curve path is next further more precisely broken down into a metal removal sector, as well as an approach or, as the case may be, departure sector. Since the work tool cutter only makes contact with the work piece in the metal removal sector, it is only this segment which serves exclusively for determination of the required relative movement of the rotating work tool cutter, which in turn determines the particular form construction necessary to achieve this relative movement, in respect to the associated rotating work piece. The curve segments working on the so-called curve fill piece sections of the approach or as the case may be departure sector are assigned the task, of achieving a stable as possible running and a planar, tangential to each other transition between the curve segments incorporated in the metal removal sectors or, as the case may be, passive sectors.

For an exact determination of the curve path in the metal removal sector, the exact radial position of the individual work tool cutters must to be taken into consideration, wherein it is preferred, that the separation thereof from the middle axis of the work tool carrier is less than the separation of the corresponding roller-body middle-point from an imaginary middle point of the cam disk. Then a concordia can be projected for the to-be-calculated roller body middle point path, whereby very soft or gentle curve movements are produced. Particularly in certain cases of stronger cutting angle changes following from nonuniform or unstable contours it can be of advantage, for the construction of the greater projected concordias, to begin with an alternative or variable curve starting point, in order to thereby attenuate the cutting angle changes of the work tool cutter. In each case, however, the curve path which is actually defined in the cam disk represents the half-roller-body-diameter transposed outwards equidistant to the calculated imaginary roller body middle point curve.

BRIEF DESCRIPTION OF THE DRAWINGS

The essence of the invention is described in greater detail in the following with respect to the six drawings.

DETAILED DESCRIPTION OF THE INVENTION

Figure 1:
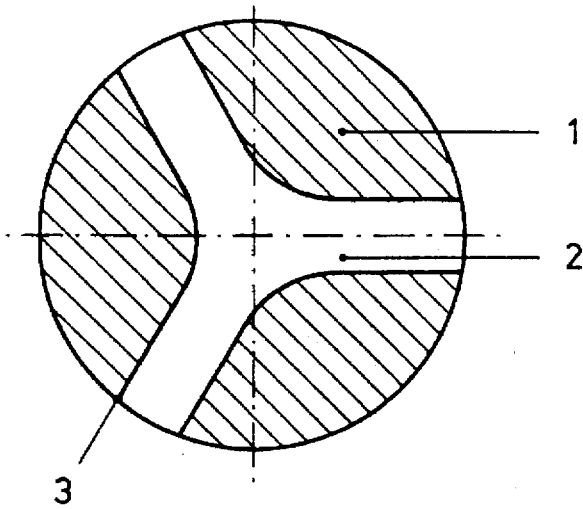
FIG. 1 shows a work piece with a star shaped groove in the front face as a work product, while in FIG. 2 there is shown the kinematic principles of the inventive process and the device for its carrying it out with respect to the processing example as shown in FIG. 1. The FIGS. 3 through 5 show respectively, by means of schematic representation, a sequence with the respective positions of the roller bodies, cutters and work piece, under the assumption of the use of three curve rollers, or, as the case may be, three cutters. In the drawing FIG. 6 a schematic is used to illustrate the practical concept of the inventive device.

In FIG. 1 there is shown in a cross-sectional representation a work piece 1 serving as a processing example, which by means of the inventive process and the corresponding device is provided with a star shaped notch 2 positioned on the front face, of which the three arms respectively intersect with each other at their transition radius. The work piece was artistically so enlarged, that its dimensions correspond to the measurements of FIG. 2. For the machining of the notch, the flank 3 of the groove which lies to the left in the figure is employed as the basis for the calculation of the path of the cutter point.

Figure 2:
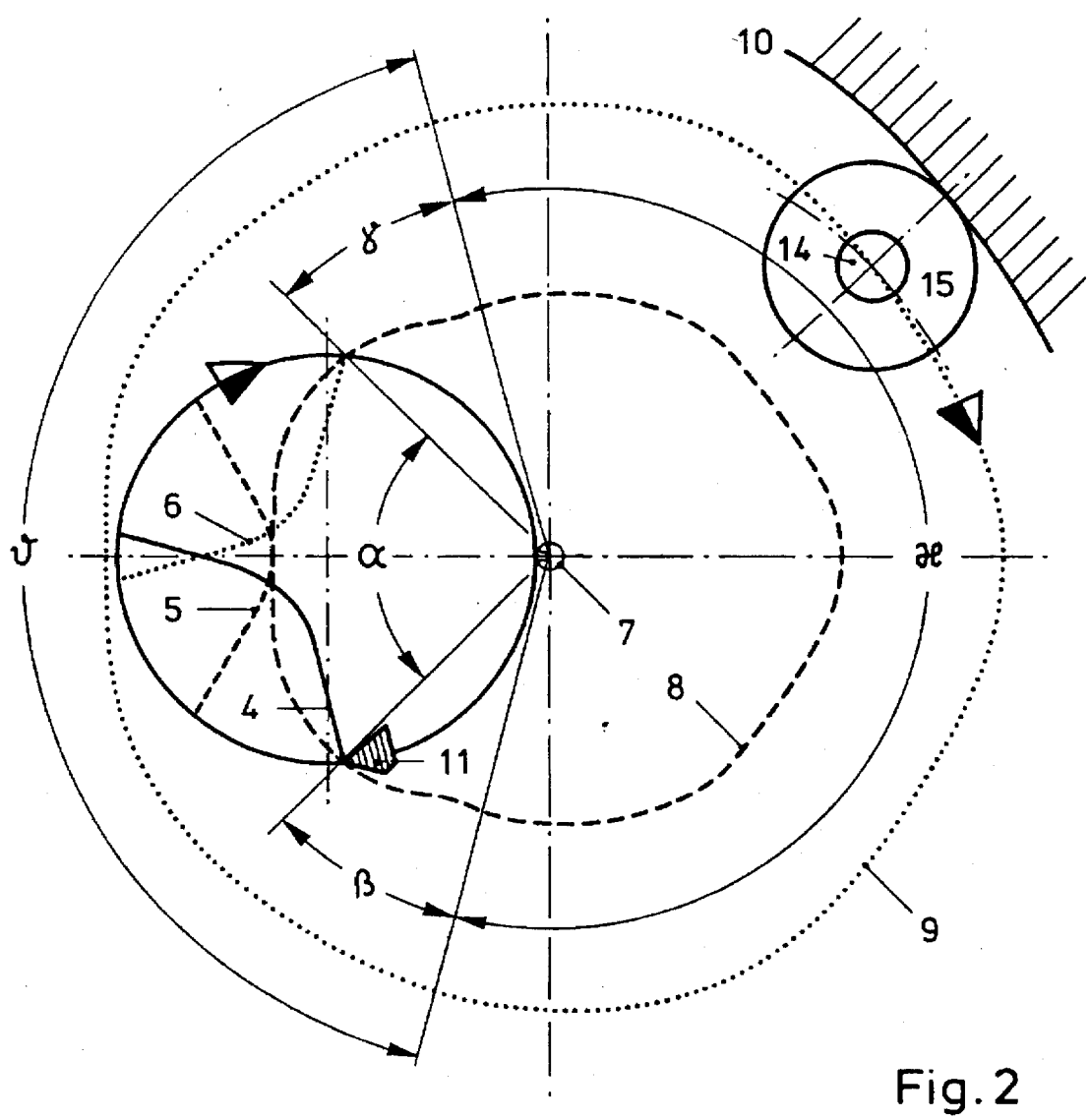

The drawing FIG. 2 clarifies the kinematic principles of the inventive process and the device for carrying it out with reference to the work processing example shown in FIG. 1. For the more or less schematic representation a stronger enlargement was selected, in order that the details are more visible. In the left half of the drawing the circumference of the work piece is indicated with a circular line. During the processing the work piece rotates about is own axis, whereby in the example a right handed rotation is selected. The rotation direction is indicated by means of an arrow. Within the circle surface of the work piece, three further lines 4, 5, 6 are indicated, which illustrate the left flank 3 of the notch in various positions during the rotation of the work piece. The center point of the not shown work tool carrier lies radially displaced with respect to the work piece (in the drawing toward the right) approximately in the area of the work piece-circumference. For the indicated example, the work tool carrier was provided with three work tool cutters staggered at 120°, of which for reasons of better visual communication only a single cutter (11) is indicated. The work tool carriers are, in the illustrative embodiment, associated with three respectively about 120° displaced roller bodies. Also in this case, only a single roller body 15 with its axis 14 is represented. A particularity of the selected example is found therein, that the three cutters of the work tool carrier are angularly rotated a half division section with respect to the position of the roller body, which has been found in practice to be of advantage. The direction of rotation the work tool carrier which corresponds to that of the work piece is indicated with an arrow drawn close to the roller body, wherein for both work tool carrier as well as also for the work piece the same rate of rotation is employed.

During the rotative revolving of the work tool carrier, its three cutters are moved along the curve 8 represented with dashed lines. At the same time the roller bodies run about with their midpoints upon the roller body-middle point track 9 indicated with dots. The roller bodies roll thereby without play upon the closed curve path 10 of the so curved disk. The cutter 11 is within the so-called active sector with the arc or revolving angle θ in the approach sector guided to the work piece with the arc or revolving angle β, until it reaches the beginning of the curve stroke 4. In the following milling or machining sector with the rotation angle or arc α the cutter runs under tension of the tool carrier up until departure at the end of the, in the meantime further moved, curve path 6 whereby a contour to be cut is produced out of the relative movement between the work tool cutter and work piece. To the end of the active rotation area there follows the so called departure area with the rotation arc or angle γ. The remaining sector with the rotation angle H is comprised of a curved movement which is complimentary to the curved movement of the active sector. It serves for the return guidance of the cutting to the approach sector prior to the re-entry point on the work piece. The device is preferably so arranged according to the invention that the first cutter is moving in the departure sector while the second cutter is already in the approach sector. The second cutter can enter into the work piece at the same instant in which the first cutter leaves the departure sector.

For the purpose of laying out the cam disk 27 in order to obtain the desired forced control, resort was made in the example to a segment of the roller-body middle-point curve utilizing an enlarged projection in the form of a circumscribing concordia, in order to obtain a soft shaped curve movement. The curve movement or curve path was also additionally thereby modified for the purpose of influencing the cutting angle of the cutter, that the respective curve starting point was slightly displaced. Curve 7 formed from curve originating middle points is represented in the center of the drawing figure. In the construction of the roller-body middle-point curve 9 there was to be taken into account besides this the angular displacement between the roller body and the cutter position. The curve path 10 of the cam disk was then calculated from the roller body-middle point curve by adding of an equidistant one-half roller-body-diameter.

Figure 3:
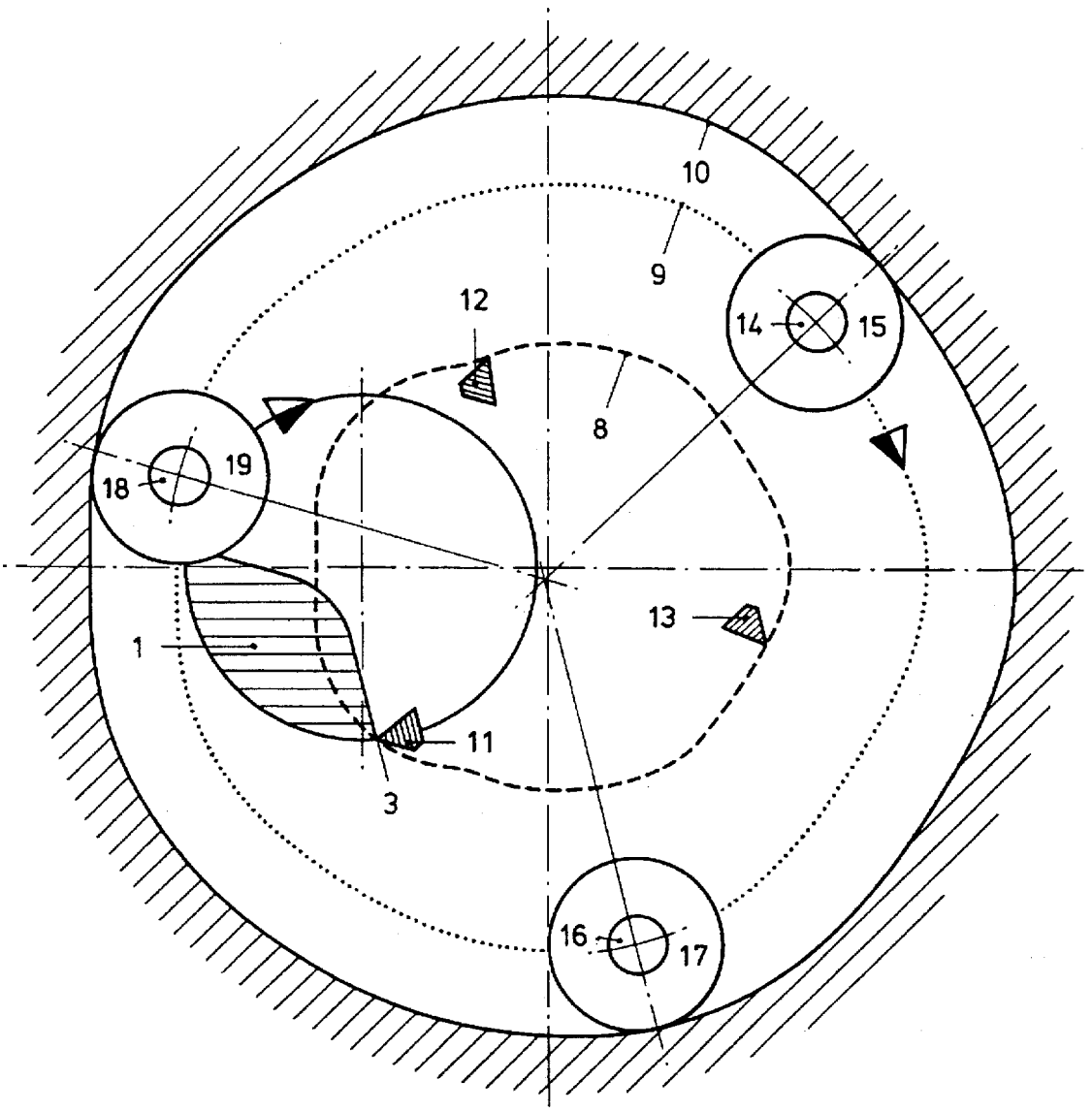
Figure 4:
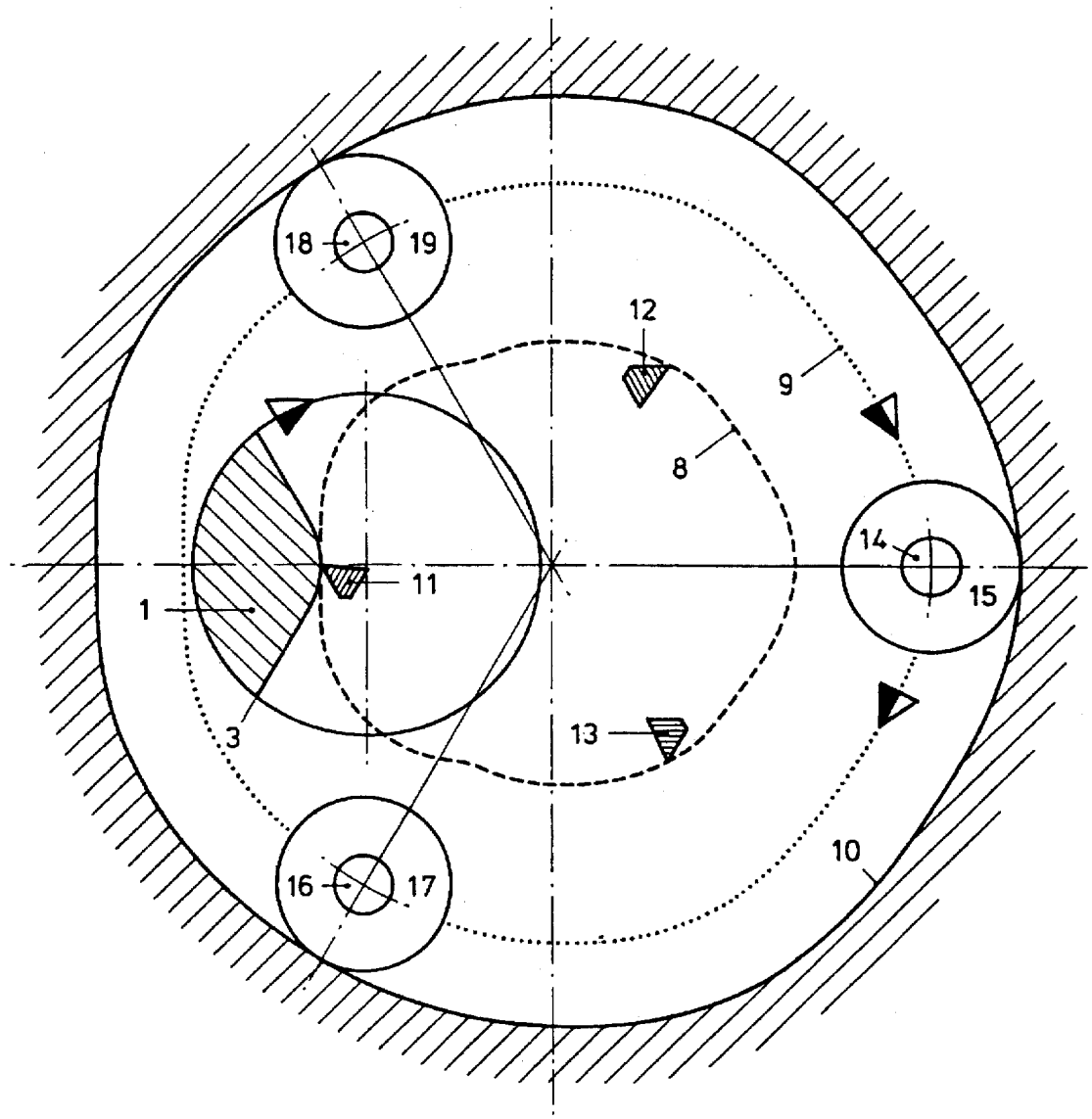
Figure 5:
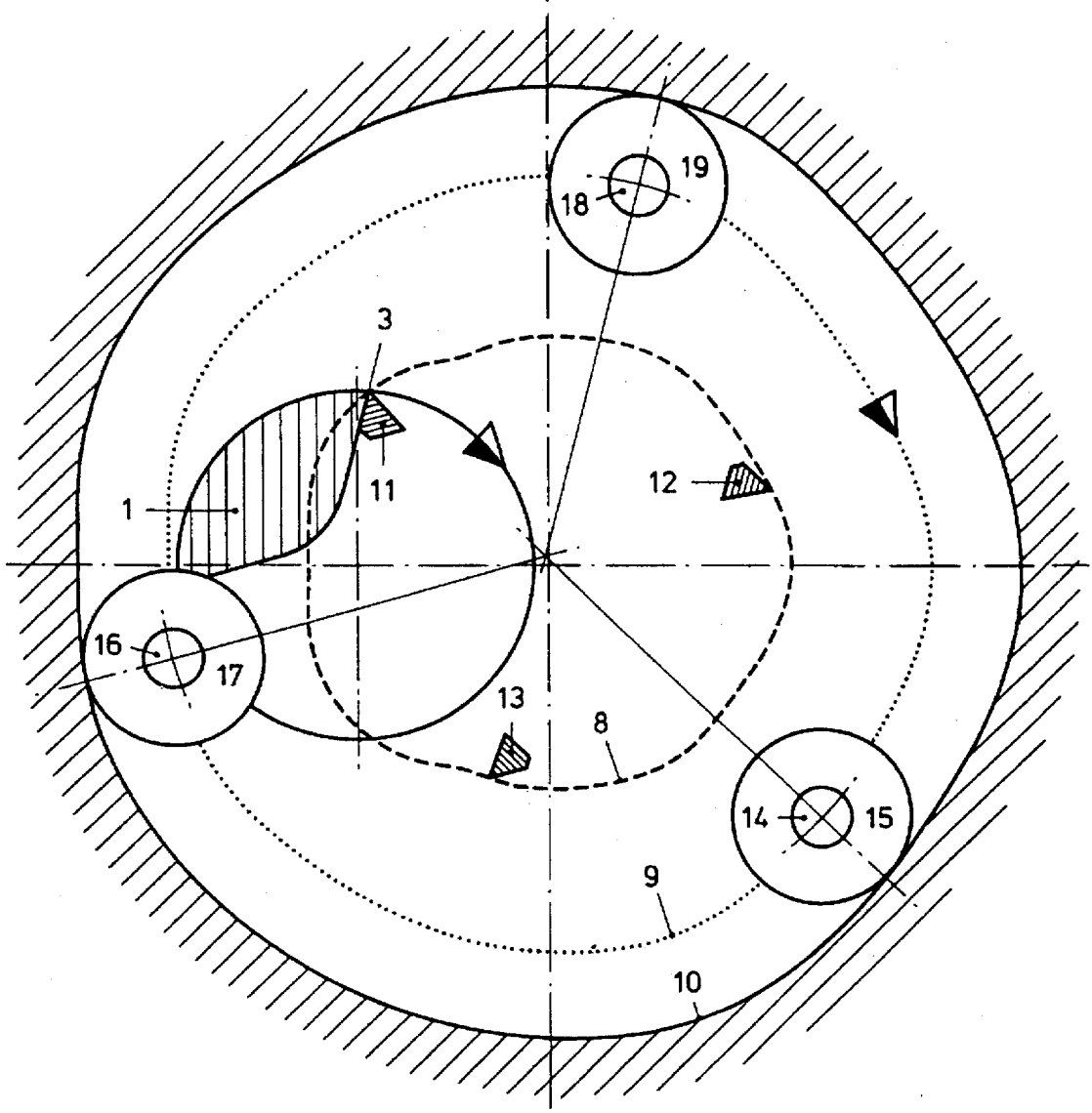

The three drawing FIGS. 3 through 5 show a sequence of the FIG. 1 referenced kinematic models wherein there are represented the respective positions of the work piece I with one of its notch flanks 3, the three cutters 11, 12, 13 and the three roller bodies 15, 17, 19 with their axis 14, 16, 18 during a machining sequence. The three roller bodies have an angular separation of 120° with respect to each other. They run on the curve path 10 of a cam disk indicated with cross-hatching. Thereby the middle points of the roller body axis move themselves upon the dotted track 9 in the direction indicated by the arrow. At the same time the work piece 1 rotates in the same direction of rotation, as indicated. The tips of the three cutters 11 securely connected to the roller body unit 12, 13 move themselves along the dashed curve 8 at this time.

FIG. 3 shows the situation at the entrance of the cutter 11 in the work piece 1. The cutter 12 has at this time already left the work piece and is to be found at approximately the end of the departure sector, while the cutter 13 is moving in the back part of the return circuit in the so called passive sector of the cutter track 8.

In FIG. 4 the total layout is represented with a timewise staggering or shift, wherein now the cutter 11 has already reached the work piece middle and the other two cutters are rotating around in the return guide area. On the basis of the synchronized rotation of the work piece 1, the thereby to be processed flank 3 of the notch has rotated further about an appropriate angular amount.

The end of the machining or metal removal sequence is shown in FIG. 5. The cutter 11 is just now exiting out of the work piece 1 and is moving into the departure sector, while the cutter 13 is at this time entering into the approach sector and the cutter 12 in the meantime is running about the back return guide area of the cutter track curve 8. On the work piece there is formed out of the relative movement to the rotating cutter 11 a representation of the flank 3 of the notch. According to the invention the above-described machining sequence is repeated in the identical manner, with the difference, that now the cutter 13 comes into contact with the next following, or as the case may be the cutter 12 with the two times thereafter following, flank of the notch. On the basis of the advancement of the work tool carrier against the work piece, there is finally, after a corresponding number of cutting sequences, the desired notch produced in full depth.

Figure 6:
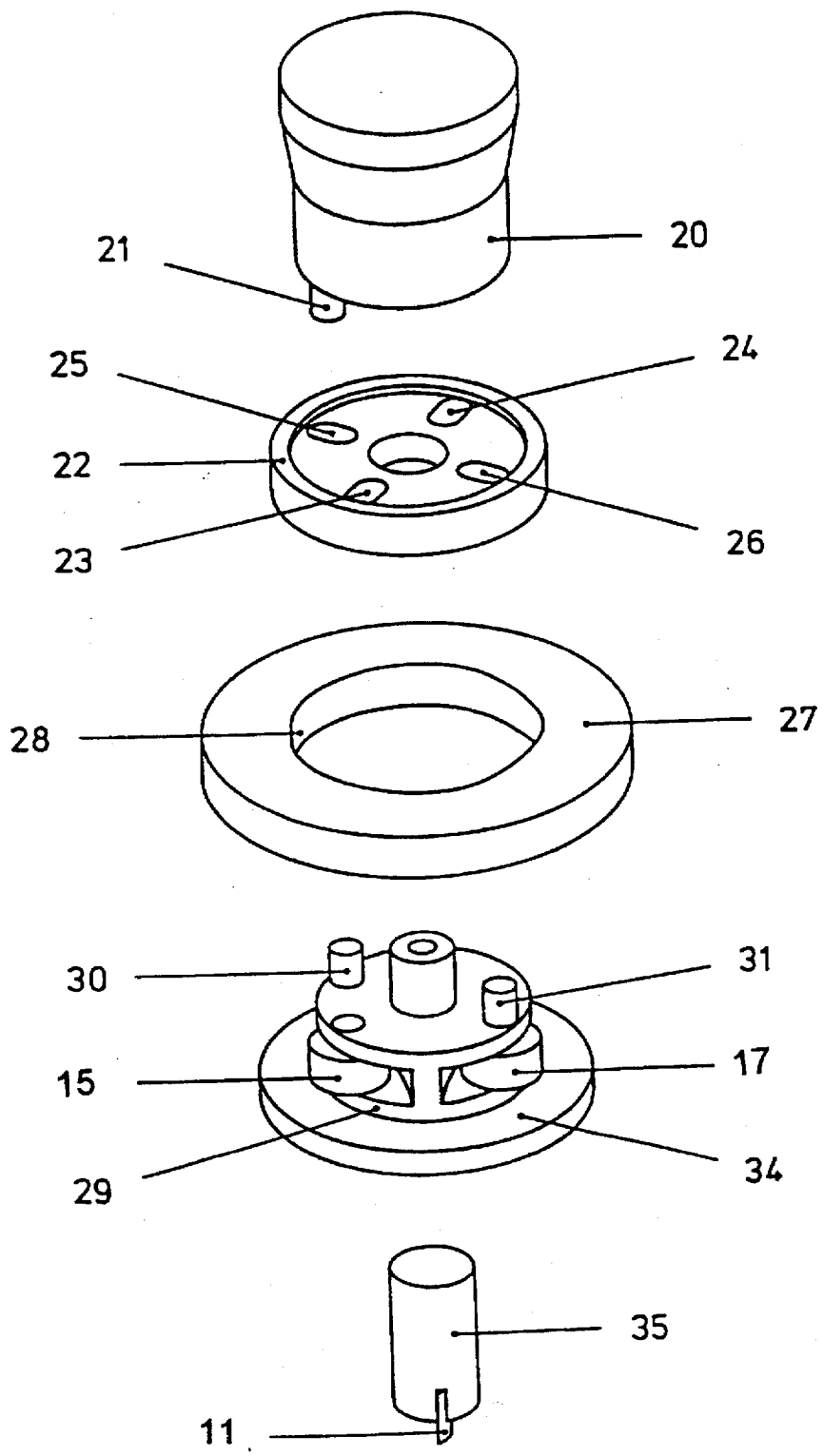

With the drawing FIG. 6 there is shown a concept for the device for carrying out the inventive process. In order not to make the sketch too cluttered and unintelligible, those types of construction details were omitted which should be well known to the man of ordinary skill working in this art. The device is driven by means of a drive shaft 20 which is shown cut-off, wherein the rotative force components are conveyed via two pins (because of the perspective representation only one pin 21 is visible) upon two opposing slits 23, 24 of a driver disk 22. The other two slits 25, 26 receive the corresponding pin 30, 31 of the tumbler head 29, so that in this manner a radially displaceable coupling line is formed. The tumbler head is for its part so securable by the use of rolling elements (for example, ball bearing cage retainers) on its flange 34 in a housing, that the engagement arm can also rotate even during radial displacement. In the tumbler head there are three roller bodies (32, 33, third not visible) rotatably mounted in angular increments of 120°. These run during operation with little tolerance (free play) in the curve path 28 of the single curve disk 27 and displaces the wobblehead during its rotation forcefully in a changing radial displacement. The tumbler head is designed on its lower end for the reception of a work piece carrier 35. The work piece carrier is provided, in the embodiment shown as indicative of the concept, with three cutters, of which for reason of the selected manner of representation only one cutting edge 36 is visible. The cutters extend axially, in order to be able to penetrate into a notch of little depth. Both the number of cutters on the work tool carrier, as well as also their working alignment (for example, radially extending) are however in retrospect adaptable in view of the respective working assignments. In order to make possible the working of various other contours, it is proposed beyond this, that the curve disk is so integrated within the device, that it can be changed out quickly and with simple means.

What is claimed is:

1. Device for form cutting and form turning, comprising:
   a drive shaft,
   a fixed housing,
   a means for rotating a work piece,
   a tool carrier provided with at least one cutter having a cutter tip, and
   a control element associated with the tool carrier for guiding contour production, said control element being comprised of at least three roller bodies associated with the tool carrier, and at least one cam disk fixedly connected to the housing and serving for guidence of the roller bodies,
   wherein the drive shaft and tool carrier are rotatably mounted in the housing and are so in operable engagement, that during the operation a rotative torque component is transmitted from the drive shaft to the tool carrier, the tool carrier however at the same time is radially displaceable, wherein during the form cutting and form turning process both a work piece being cut as well as also the work tool carrier provided with at least one cutter are, under maintenance of a set rotational numeric relationship with respect to each other, rotating relative to each other with their respective axis of rotation offset by a predetermined amount, and are so axially driven as to effect a rate of feed, wherein the cutter travels about an orbit and during its orbiting is displaced from a pure circular orbital path in the radial plane such that a contour to be machined is produced out of the relative movement between the revolving cutter tip and the rotating work piece, wherein this displacement is controllable by means of said control element, and
   wherein the roller body has a middle point at it's center axis and the curved profile of the cam disk is defined by the outer edge of the roller body traveling a predetermineable roller body middle point value curve (9), wherein the roller body middle point curve in relation to its full orbit is divisible into an active and a passive realm, of which the active realm is comprised of a machining area α of not greater than 240°, an approach-area (β) and a departure area γ, wherein the roller body middle point curve in the machining area together with the rotational movement of the work piece and the fixed position of the cutting tip of the tool carrier and its orbit results in a relative movement, which describes the contour to be machined.

2. Device according to claim 1, wherein the radial distance from the roller body middle point to the axis of the tool carrier is larger than the corresponding distance of the cutting tip, and the roller-body middle-point curve (9) is established as a concordia through radial enlargement of the starting point track (8) which serves as the beginning curve for the cutter tip.

3. Device according to claim 2, wherein for the determination of the starting curve (8) and the radial to the starting curve enlarged concordia (9) a variable originating point is determined, in order to maintain the contour machining angle changes of the work tool cutter occurring during particular machining process as small as possible.

4. Device according to claim 1, wherein the transitions between the individual segments representing the passive area, approach area, machining area and departure area of the curve path 10 of the cam disk in shape are rounded.

5. Device according to claim 1, wherein the curved profile of the cam disk in a first segment is associated with the contour to be machined, while the remaining area of the curved profile forms a complementary curve to the first segment.

6. Device according to claim 1 wherein at least one cutting tip of one of the cutters mounted on the work tool carrier is positioned on a fixed angle ray, as one of the work tool associated roller bodies.

7. Device according to claim 1 wherein at least one cutting tip of one of the work tool carrier mounted cutters is positioned on a ray, of which the angle is precisely in the middle between two of the work tool carrier associated roller bodies.

* * * * *